(12) United States Patent
Hetzer et al.

(10) Patent No.: US 8,280,215 B2
(45) Date of Patent: Oct. 2, 2012

(54) MULTIFIBER LOOSE BUFFER RECEIVING ELEMENT FOR A DISTRIBUTING DEVICE FOR OPTICAL WAVEGUIDES

(75) Inventors: Ulrich Hetzer, Berlin (DE); Frank Mossner, Berlin (DE); Ferenc Nad, Berlin (DE)

(73) Assignee: ADC GmbH, Berlin (DE)

( * ) Notice: Subject to any disclaimer, the term of this patent is extended or adjusted under 35 U.S.C. 154(b) by 369 days.

(21) Appl. No.: 12/528,681

(22) PCT Filed: Feb. 15, 2008

(86) PCT No.: PCT/EP2008/001156
§ 371 (c)(1),
(2), (4) Date: Aug. 26, 2009

(87) PCT Pub. No.: WO2008/104283
PCT Pub. Date: Sep. 4, 2008

(65) Prior Publication Data
US 2010/0061692 A1    Mar. 11, 2010

(30) Foreign Application Priority Data
Mar. 1, 2007 (DE) .................. 10 2007 010 853

(51) Int. Cl.
*G02B 6/00* (2006.01)
(52) U.S. Cl. .................................................. 385/135
(58) Field of Classification Search .................. None
See application file for complete search history.

(56) References Cited

U.S. PATENT DOCUMENTS

| | | | |
|---|---|---|---|
| 3,728,467 A | 4/1973 | Klayum et al. | |
| 3,780,813 A * | 12/1973 | Davis et al. | 172/438 |
| 4,913,522 A * | 4/1990 | Nolf et al. | 385/95 |
| 5,210,374 A | 5/1993 | Channell | |
| 5,261,024 A | 11/1993 | Allen et al. | |
| 5,430,823 A | 7/1995 | Dupont et al. | |
| 5,544,273 A * | 8/1996 | Harrison | 385/135 |
| 5,548,678 A * | 8/1996 | Frost et al. | 385/135 |
| 5,689,606 A * | 11/1997 | Hassan | 385/135 |
| 5,758,004 A | 5/1998 | Alarcon et al. | |
| 5,764,844 A | 6/1998 | Mendes | |
| 5,774,618 A | 6/1998 | Jones | |
| 5,790,741 A * | 8/1998 | Vincent et al. | 385/135 |
| 5,793,920 A | 8/1998 | Wilkins et al. | |
| 5,884,002 A | 3/1999 | Cloud et al. | |
| 6,178,282 B1 | 1/2001 | Moribe et al. | |
| 6,240,930 B1 * | 6/2001 | Yuhara | 132/293 |
| 6,275,639 B1 | 8/2001 | Bolt et al. | |

(Continued)

FOREIGN PATENT DOCUMENTS

DE    3528246    2/1987

(Continued)

OTHER PUBLICATIONS

U.S. Non-Final Office Action cited in U.S. Appl. No. 12/528,698, mailed Jun. 27, 2011.

(Continued)

*Primary Examiner* — M. Stahl
(74) *Attorney, Agent, or Firm* — Merchant & Gould P.C.

(57) ABSTRACT

The invention relates to a bundle core repository (7) for a distribution device for optical waveguides, comprising a housing having a lateral opening (103), the bundle core repository (7) being connected to a lower part (109) via a pivot bearing (108).

7 Claims, 10 Drawing Sheets

U.S. PATENT DOCUMENTS

| | | |
|---|---|---|
| 6,434,313 B1 | 8/2002 | Clapp, Jr. et al. |
| 6,438,310 B1 * | 8/2002 | Lance et al. ............... 385/135 |
| 6,556,763 B1 | 4/2003 | Puetz et al. |
| 6,612,515 B1 | 9/2003 | Tinucci et al. |
| 6,616,463 B1 | 9/2003 | Burnett et al. |
| 6,661,961 B1 * | 12/2003 | Allen et al. ............... 385/135 |
| 7,038,137 B2 | 5/2006 | Grubish et al. |
| 7,302,151 B2 | 11/2007 | Lapp |
| 7,352,945 B2 * | 4/2008 | Holmberg et al. ......... 385/135 |
| 7,783,152 B2 | 8/2010 | Knorr et al. |
| 8,070,112 B2 * | 12/2011 | Smrha et al. ............... 248/61 |
| 2002/0051616 A1 | 5/2002 | Battey et al. |
| 2003/0072551 A1* | 4/2003 | Douglas et al. ............ 385/135 |
| 2003/0223725 A1 | 12/2003 | Laporte et al. |
| 2005/0249475 A1 | 11/2005 | Womack et al. |
| 2006/0145866 A1* | 7/2006 | Marsilio et al. ........... 340/572.8 |
| 2009/0087158 A1 | 4/2009 | Knorr et al. |
| 2010/0061686 A1 | 3/2010 | Hetzer et al. |
| 2010/0061687 A1 | 3/2010 | Hetzer et al. |
| 2010/0150515 A1 | 6/2010 | Mossner |
| 2010/0183275 A1 | 7/2010 | Hetzer et al. |

FOREIGN PATENT DOCUMENTS

| | | |
|---|---|---|
| DE | 691 24 902 | 6/1997 |
| DE | 202 20 848 | 5/2004 |
| DE | 103 14 262 | 6/2004 |
| DE | 20 2006 006 018 | 8/2006 |
| EP | 0 159 857 | 10/1985 |
| EP | 0 498 599 | 7/1996 |
| EP | 1 431 793 | 6/2004 |
| GB | 2 307 563 | 5/1997 |
| GB | 2 373 493 | 9/2002 |
| WO | WO 93/26070 | 12/1993 |
| WO | WO 94/23324 | 10/1994 |
| WO | WO 97/19377 | 5/1997 |
| WO | WO 99/67670 | 12/1999 |
| WO | WO 00/65397 | 11/2000 |
| WO | WO 2004/051337 | 6/2004 |

OTHER PUBLICATIONS

U.S. Non-Final Office Action cited in U.S. Appl. No. 12/528,718, mailed Jun. 24, 2011.

* cited by examiner

MULTIFIBER LOOSE BUFFER RECEIVING ELEMENT FOR A DISTRIBUTING DEVICE FOR OPTICAL WAVEGUIDES

This application is a National Stage Application of PCT/EP2008/001156, filed 15 Feb. 2008, which claims benefit of Serial No. 10 2007 010 853.4, filed 1 Mar. 2007 in Germany and which application(s) are incorporated herein by reference. To the extent appropriate, a claim of priority is made to each of the above disclosed applications.

BACKGROUND

The invention relates to a bundle core repository for a distribution device for optical waveguides.

In distribution devices for optical waveguides, optical waveguide fibers are connected to other fibers or optical elements such as plugs or couplers. The optical waveguide fibers are in this case generally guided in the form of bundle cores to the distribution device. In this case, a bundle core comprises at least two optical waveguide fibers having a common sheathing. The bundle cores themselves can further be combined in an optical waveguide cable. In this case, the optical waveguide cable comprises a large number of bundled cores, which can be arranged around a common central element, the optical waveguide cable having an outer sheathing surrounding all the bundle cores and the central element. If appropriate, a metal foil, which acts as a moisture diffusion protection, is also arranged between the outer sheathing and the bundle cores, the metal foil preferably being in the form of an aluminum foil.

In distribution devices there is often the problem that not all incoming bundle cores or their fibers are intended to spliced, rather that some bundle cores are intended to be guided into the distribution device merely for storage purposes, some then being passed out of the distribution device again unchanged. In this case, it is known that the bundle cores are wound up into a coil and the coil acting as the reserve length is stopped between a carrier system of the distribution device. This saves on separate storage devices, but results in confusion in the distribution device.

SUMMARY

The invention is therefore based on the technical problem of providing a bundle core repository for a distribution device for optical waveguides which makes it possible for bundle cores to be accommodated in structured fashion and which is simple to use.

In this regard, the bundle core repository for a distribution device for optical waveguides comprises a housing having a lateral opening, the bundle core repository being connected to a lower part via a pivot bearing. This makes it possible to deposit the bundle cores centrally and in ordered fashion, it being possible for the bundle core repository to be arranged in optimized fashion in terms of physical space in the distribution device owing to its pivotable design and, at the same time it being possible for it to be pivoted into a convenient working position. In this case, the bundle core repository is preferably connected to a carrier system of the distribution device via the lower part, further preferably the arrangement taking place on an upper side of the carrier system.

In a preferred embodiment, a supporting strut, which supports the bundle core repository against the lower part in a pivoted-up position (working position), is arranged on the lower part.

In a further preferred embodiment, the bundle core repository can be pivoted through 90°, it also being possible for the pivoting angle to be slightly less than 90°, for example 85°-89°. This prevents already accommodated bundle cores from falling out of the bundle core repository.

In a further preferred embodiment, the bundle core repository is sealed by a removable cover. As a result, the bundle core can be inserted into the bundle core repository from above in a very convenient manner.

In a further preferred embodiment, a winding cylinder is arranged on a bottom face of the bundle core repository onto which winding cylinder the bundle cores can be wound. In this case, the winding cylinder ensures that the minimum bending radii for the bundle cores are not undershot.

In a further preferred embodiment, a latching hook, which is latched with the lower part in an initial position, is arranged on the lower side of the bundle core repository.

In a further preferred embodiment, the housing of the bundle core repository has a cylindrical shape.

In a further preferred embodiment, sprung props, which support the housing of the bundle core repository against a housing of the distribution device, are cut out of the outer face.

The distribution device for optical waveguides can in this case be in the form of a sleeve, a cable splitter or a sealing end, for example.

BRIEF DESCRPTION OF THE DRAWINGS

The invention will be explained in more detail below with reference to a preferred exemplary embodiment. In the figures.

DETAILED DESCRIPTION

Figure 1:
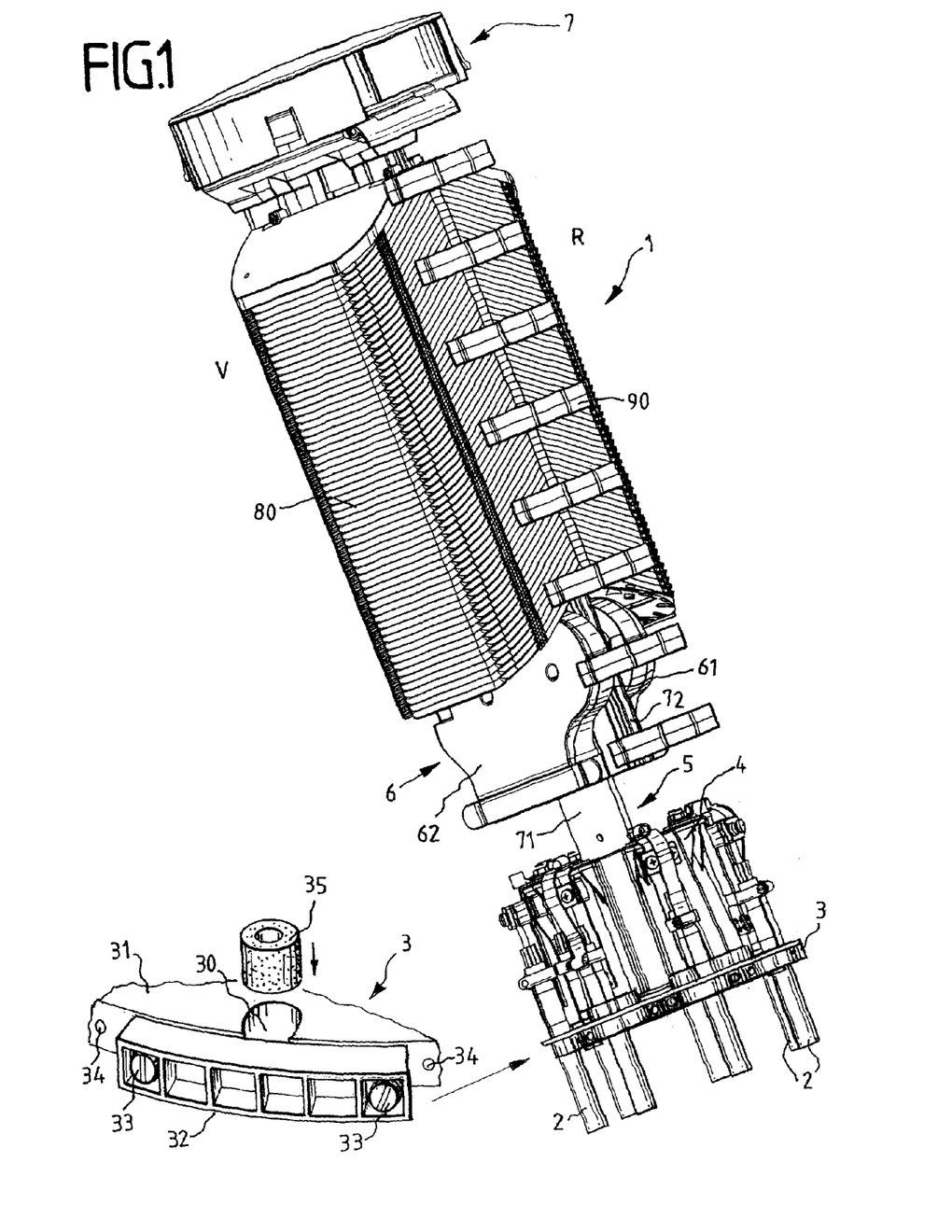
FIG. 1 shows a perspective front view of a sleeve for optical waveguide cables without a housing upper part.
Figure 11:
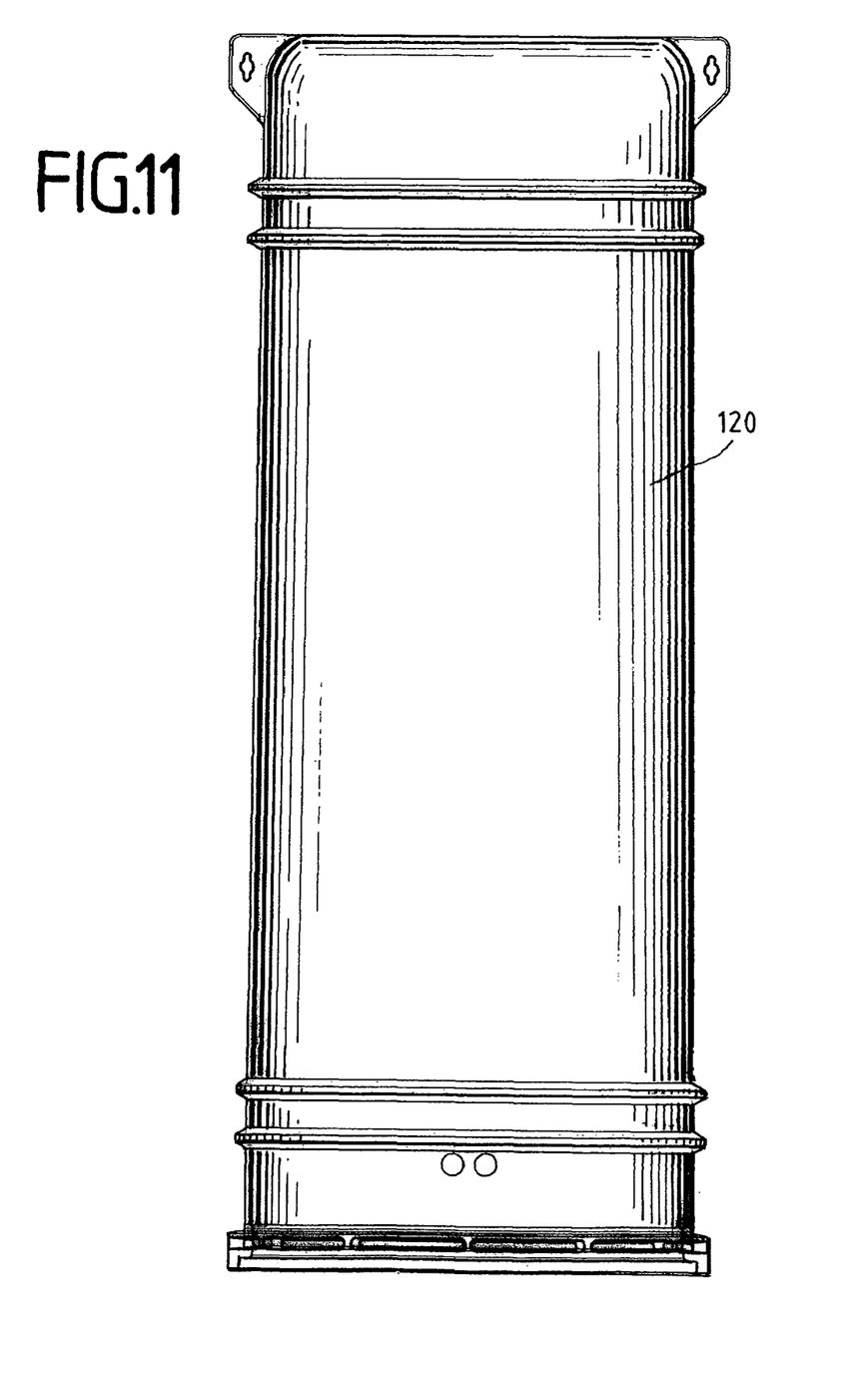
FIG. 11 shows a side view of a housing upper part.

FIG. 1 illustrates a sleeve 1 for optical waveguide cables 2 without a housing upper part 120 (see FIG. 11). The sleeve comprises a housing lower part 3, a console 4, a carrier system 5, a fiber management unit 6 and a bundle fiber repository 7. The housing lower part 3 is formed with openings 30 for optical waveguide cables 2, which are sealed off from moisture via sealing elements 35. In this case, the housing lower part 3 is designed to have two or more parts, lateral circumferential parts 32 of the housing lower part 3, including edge parts of the openings 30, being fixed detachably on a base plate 31, preferably by means of screws 33, which are screwed into a thread 34 of the base plate 31. Preferably, as many circumferential parts 32 are arranged detachably as openings 30 for optical waveguide cables 2 are provided, precisely one opening 30 being exposed laterally or radially by each circumferential part 32.

Figure 2:
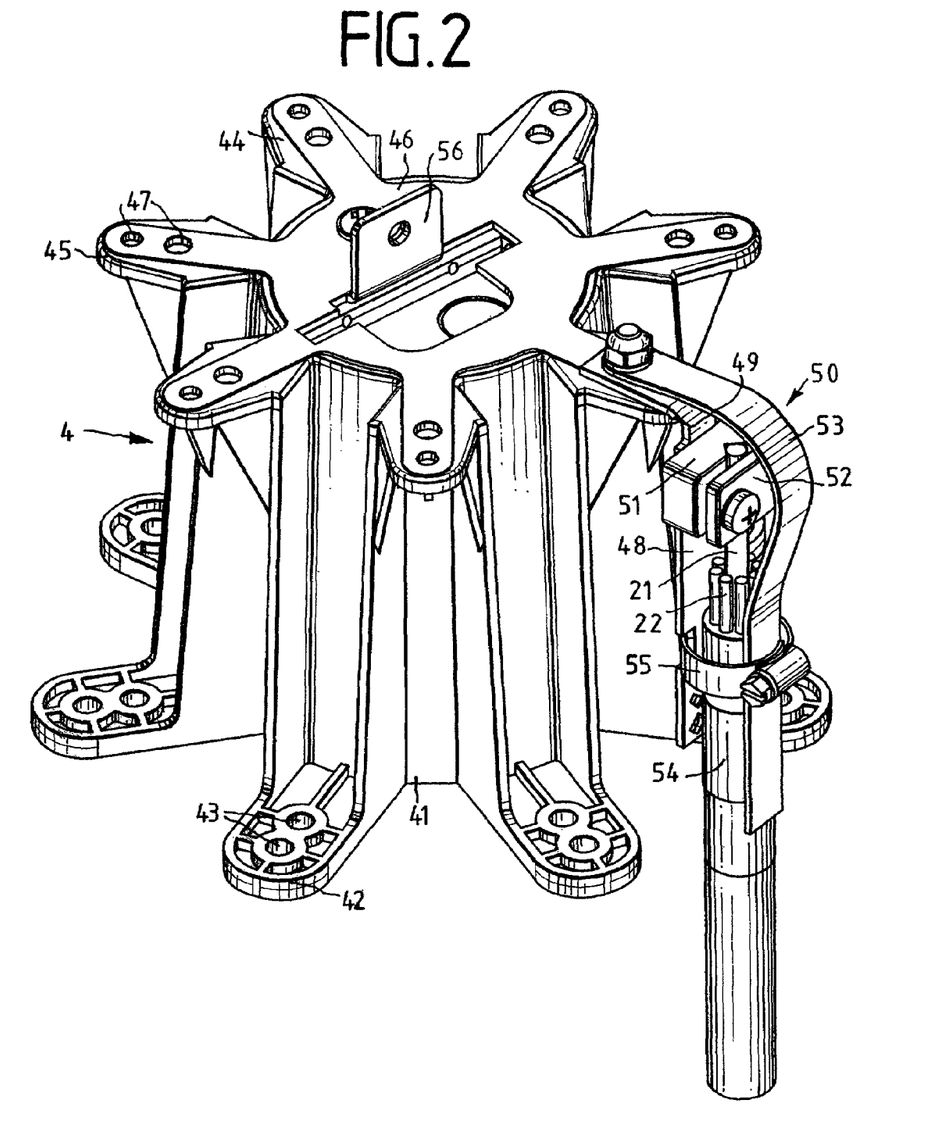
FIG. 2 shows a perspective illustration of a console with a ground plate.

First, the manner in which the optical waveguide cables 2 are connected will be explained with reference to FIG. 2. The console 4 which consists of plastic has a star-shaped cross section and is formed on the lower side 41 with pedestal feet 42, which have holes 43. The console 4 can then be screwed to the housing lower part 3 by means of screws, which are not illustrated. The upper side 44 has a round central region, from which seven rests 45 protrude in the form of a star. A ground plate with holes 47, which are aligned with openings in the rests 45, is formed on the upper side 44. In each case one angled sheet-metal part 48, which has a desired bending point 49 in the form of a tapered portion, is screwed onto the ground plate 46. A fixing element 50 for fixing a central element 21 of the optical waveguide cable 2 is arranged on the angled sheet-metal part 48. The fixing element 50 comprises a jaw 51 with an indentation and a plate 52 which can be screwed. In the example illustrated, a connection of the optical waveguide cable 2 to ground is illustrated by a ground strip 53, which is screwed to the angled sheet-metal part 48 and the console 4. The ground strip 53 is in this case bent such that it bears against the optical waveguide cable 2 on the side opposite the angled sheet-metal part 48. A connection to ground in the case of optical waveguide cables 2 is usually used when said optical waveguide cables are formed with a metal foil as diffusion protection against moisture. For this purpose, the outer sheathing of the optical waveguide cable 2 is then partially removed and the metal foil exposed. Then, a scroll spring 54 is wound onto the exposed metal foil and the ground strip 53, which scroll spring 54 then presses the ground strip 53 in a sprung manner against the metal foil and therefore then connects them electrically to one another (which is not illustrated in FIG. 2). The ground strip 53 is then screwed to the angled sheet-metal part 48 and the ground plate 46, the ground connection then being guided outwards via a connection (not illustrated) to the screws 33 of the lower part 3. Furthermore, the angled sheet-metal part 48 and the optical waveguide cable 2 are connected mechanically to one another via a clip 55, with the result that the optical waveguide cable 2 is fixed mechanically. Furthermore, a plurality of bundle cores 22 are illustrated in FIG. 2 which are arranged around the central element 21. Bundle cores 22 comprise a plurality of fibers having a common sheathing. For reasons of clarity, the bundle cores 22 are in this case illustrated such that they are cut away, whereas they are actually guided upwards. Furthermore, a fixing limb 56 is illustrated, to which a central carrier 71 of the carrier system 5 is screwed. A defective housing lower part 3 can be replaced by means of the desired bending point 49 and the detachable circumferential parts 32 of the housing lower part 3 without optical waveguide connections in the sleeve 1 being separated. For this purpose, the circumferential parts 32 of the housing lower part 3 are detached where optical waveguide cables 2 are connected. Then, the optical waveguide cables 2 are bent away at an angle to the side via the desired bending point 49, and the defective housing lower part 3 is removed. A reverse procedure is correspondingly used for mounting a new housing lower part 3.

Figure 3:
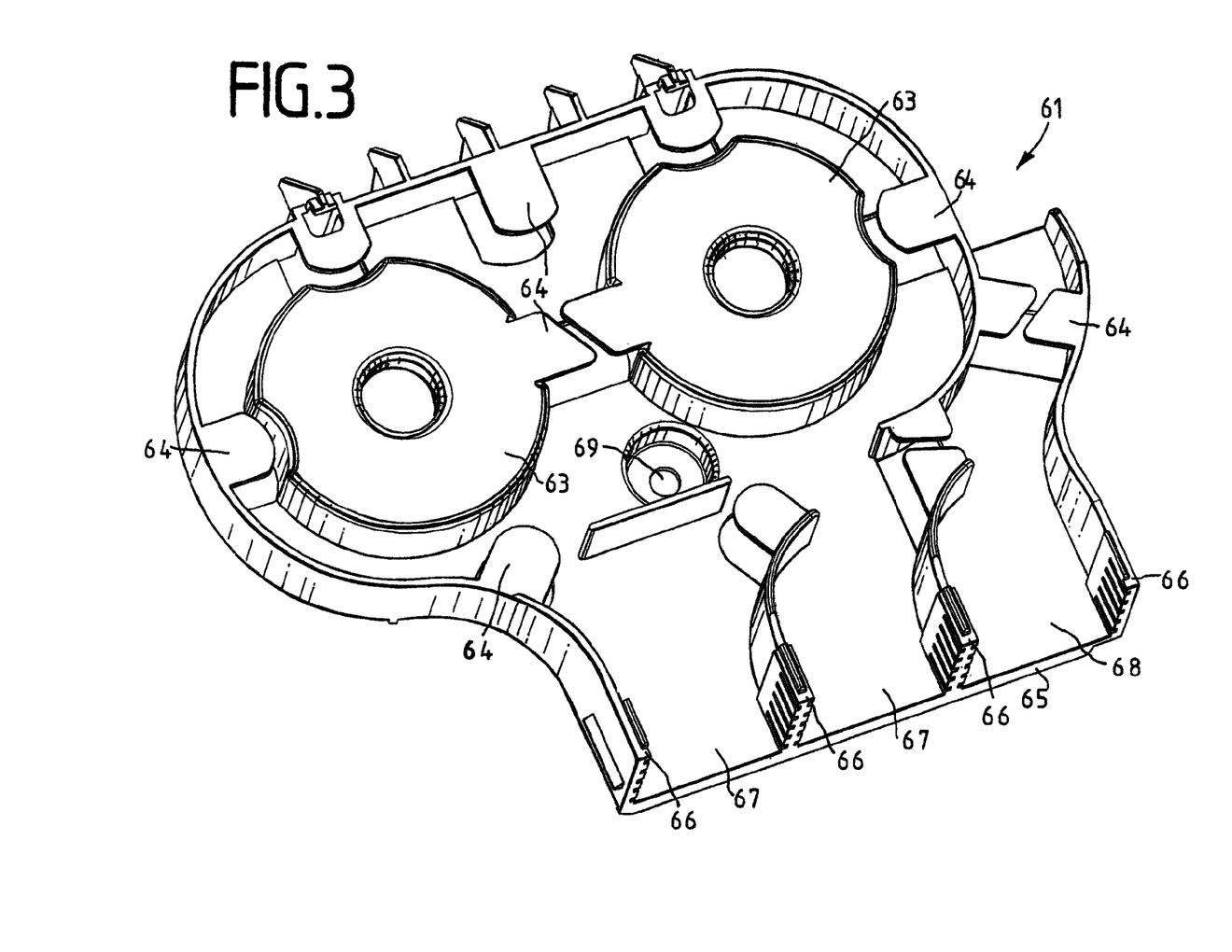
FIG. 3 shows a perspective front view of a part of the fiber management unit.

FIG. 3 illustrates a fiber guide 61 of the fiber management unit 6, which is hidden in FIG. 1 by a covering 62. As illustrated in FIG. 1, a fiber guide 61 is arranged on the front side V of the carrier system 5 and a fiber guide 61 is arranged on the rear side R of the carrier system 5. The fiber guide 61 comprises two coil formers 63 and a plurality of retainers 64. Guide webs 66, which form guides 67, 68, are arranged on a lower side 65, which faces the console 4. If it is now intended for individual fibers of a bundle core 22 to be connected to another optical waveguide cable 2, the bundle core is cut. The end of the bundle cores is fixed in the region 67 and 68 in a part not illustrated. The fibers, which are intended to be connected to another optical waveguide cable 2, are supplied via the guide 68 to one or more splicing cassettes 80, which are arranged above the fiber management unit 6 on the front side V and rear side R of the carrier system 5. In this case, both the incoming fiber and the outgoing fiber are guided in the guide 68. The remaining fibers of a bundle core 22, which are not intended to be connected to another optical waveguide cable 2, but are intended to be looped through, are guided into the guide 67. There, the necessary reserve length or splicing reserve is wound onto the coil formers 63, and then these fibers are guided out of the other guide 67 back to the optical waveguide cable 2. In the center, the fiber guide 61 has an opening 69, through which the fiber guide 61 can be screwed to the central carrier 71 of the carrier system 5.

Figure 4:
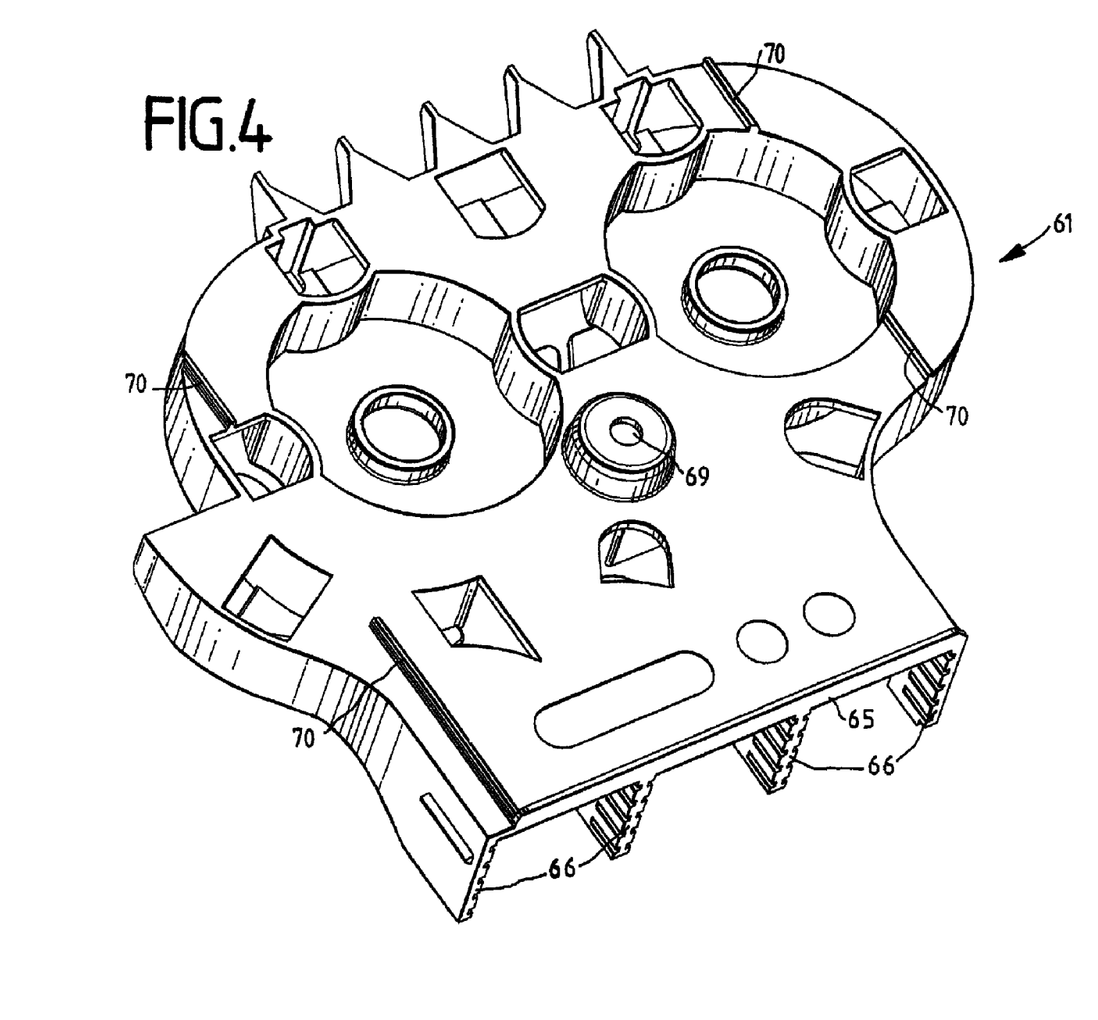
FIG. 4 shows a perspective rear view of the part shown in FIG. 3.

FIG. 4 illustrates the rear side of the fiber guide 61, which bears against the carrier system 5. In this case, the fiber guide 61 has four stop edges 70, which stop against edges of the carrier system 5 and therefore prevent the fiber guide 61 from tipping.

Figure 5:
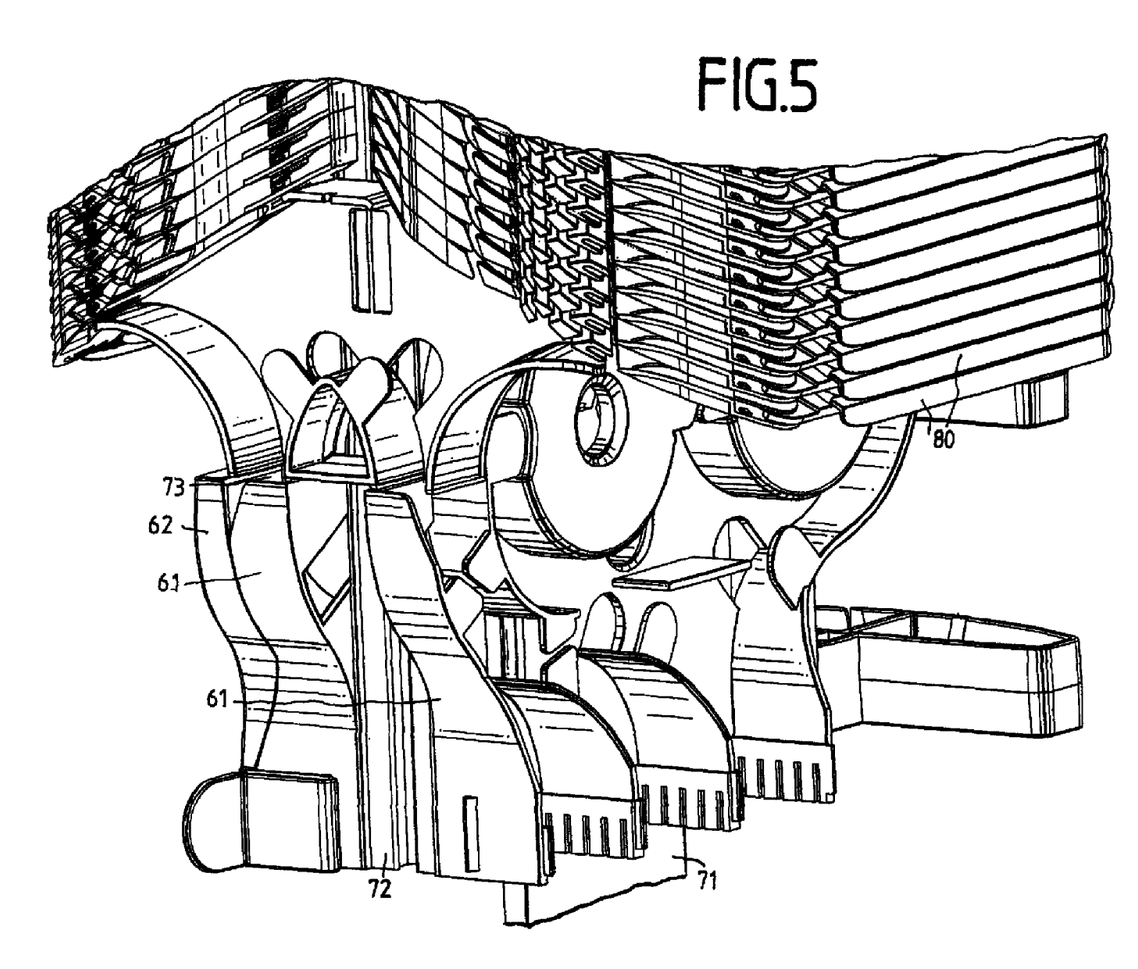
FIG. 5 shows a perspective side view of the fiber management unit.

FIG. 5 illustrates the fiber management unit 6 in a side view. The two fiber guides 61 for the front side V and the rear side R are screwed to the central carrier 71 of the carrier system 5, the stop edges 70 stopping against stop edges of two profiled carriers 72, which are connected to the central carrier 71, the rear profiled carrier 72 being hidden in the illustration. A lateral fiber guide 74, which allows for the fibers to jump laterally from the front side V to the rear side R of the sleeve 1 are arranged laterally on the upper side 73 of the fiber guides 61 for the front side V and the rear side R. The lateral fiber guide 74 can in this case be a separate component or else one half can in each case be connected integrally to the fiber guides 61 for the front side V and rear side R.

Figure 6:
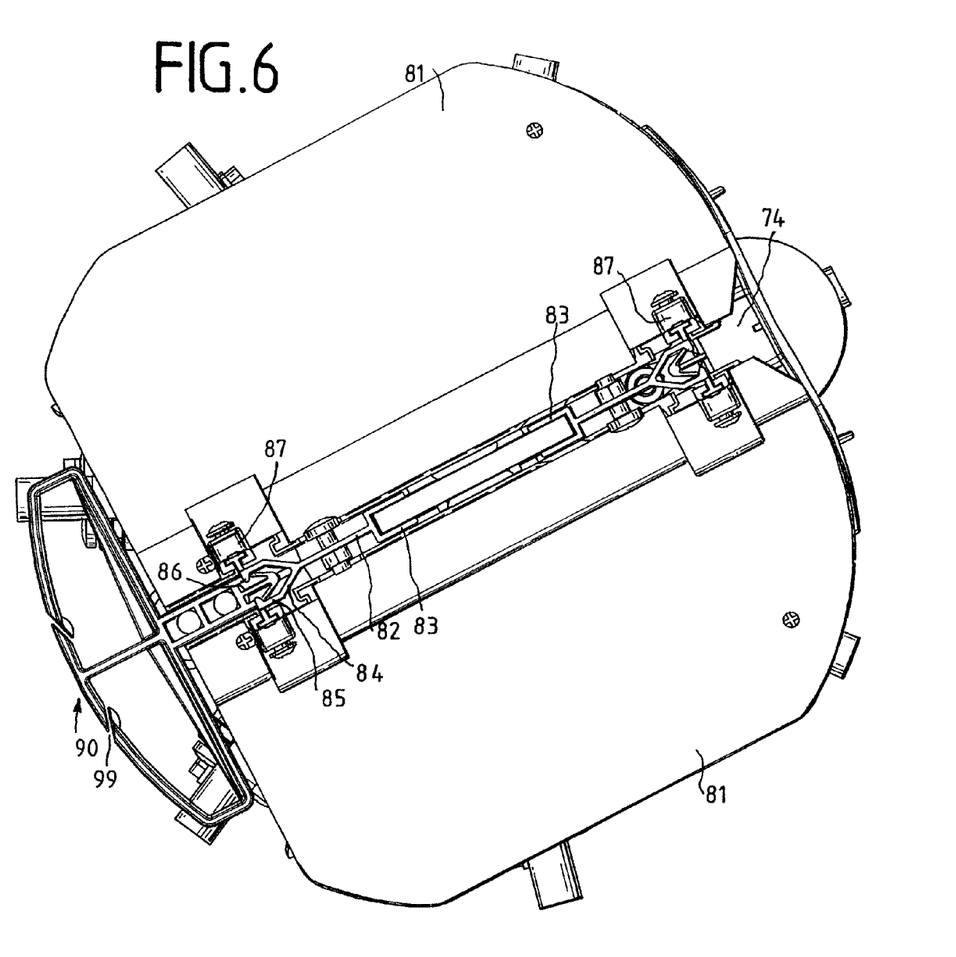
FIG. 6 shows a plan view of the sleeve with the bundle core repository removed.

FIG. 6 illustrates a plan view of the sleeve 1 with the bundle core repository 7 removed. In this case, coverings 81 for the splicing cassettes 80 are illustrated. The profiled carriers 72 have a central plate-shaped region 82, which is adjoined by a U-shaped region 83. The other side is adjoined by a region 84, which is initially in the form of a V, in this case the limbs 85 running parallel and having inwardly pointing bent-back portions 86. The splicing cassettes 80 are pushed onto the profiled carriers 72 from above. Then, the covering 81 is pushed over the last, uppermost splicing cassette 80 and fixed via stoppers 87, which can be screwed. Bundle core guides 90 are inserted into the region 84 of the left-hand profiled carrier. For example, the lateral fiber guide 74 is inserted on the other profiled carrier 72.

Figure 7:
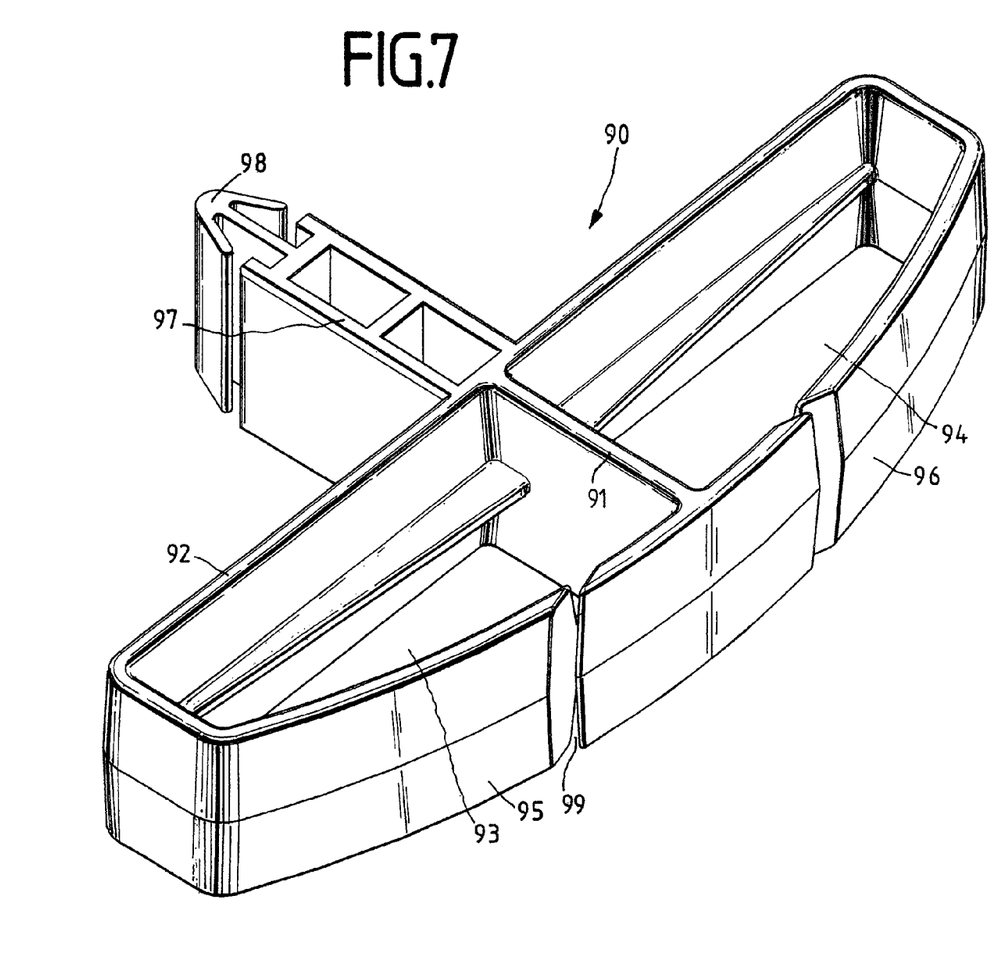
FIG. 7 shows a perspective illustration of a bundle core guide.

The bundle core guide 90 comprises a central web 91, which splits an outer edge 92 into two guides 93, 94 (see FIG. 7). In this case, the outer edge 92 is formed at in each case one of the guides 93, 94 with a cut-free portion 99, with the result that the parts 95, 96 of the outer edge 92 are sprung. This makes it possible to insert the bundle cores 22 laterally. The bundle core guide 90 is formed with a shaft 97 as an extension of the central web 91, an arrow-shaped attachment 98 being arranged at the end of said shaft 97. If the bundle core guide 90 is then plugged into the profiled carrier 72, the arrow-shaped attachment 98 latches behind the bent-back portion 86 of the profiled carrier 72. Owing to the design with two guides 93, 94, a clearly separated split between the bundle core 22 being guided towards the bundle core repository 7 and the bundle core 22 being guided back can be achieved.

Figure 8:
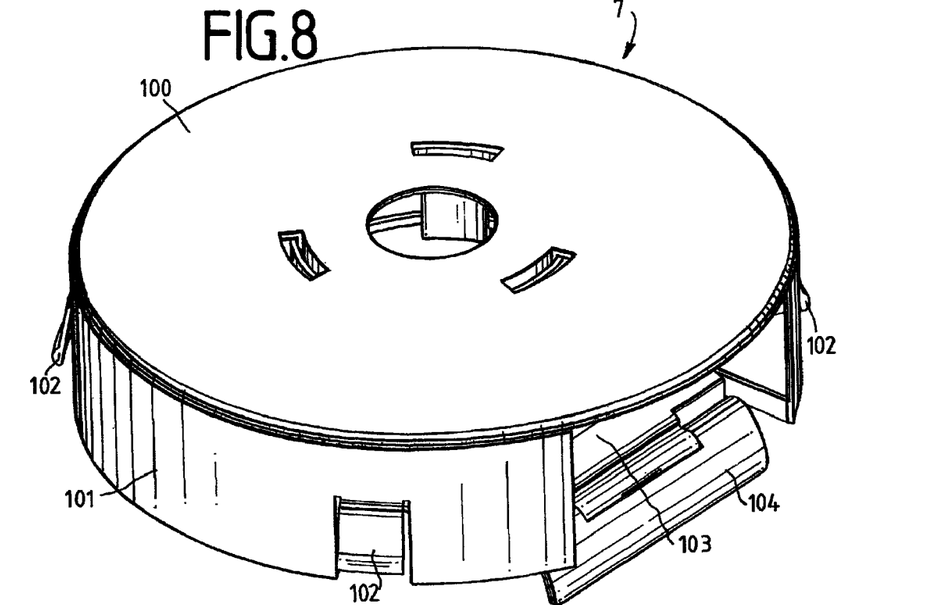
FIG. 8 shows a perspective illustration of a bundle core repository.

FIG. 8 illustrates the bundle core repository 7. The bundle core repository 7 has a substantially cylindrical shape, which is closed towards the top by a removable cover 100. Three sprung props 102 are cut free from the outer face 101, press in a sprung manner against the turned-over housing upper part 120 and therefore stabilize the bundle core repository 7. Furthermore, the bundle core repository 7 has an opening 103, beneath which a rounded-off portion 104 is arranged.

Figure 9:
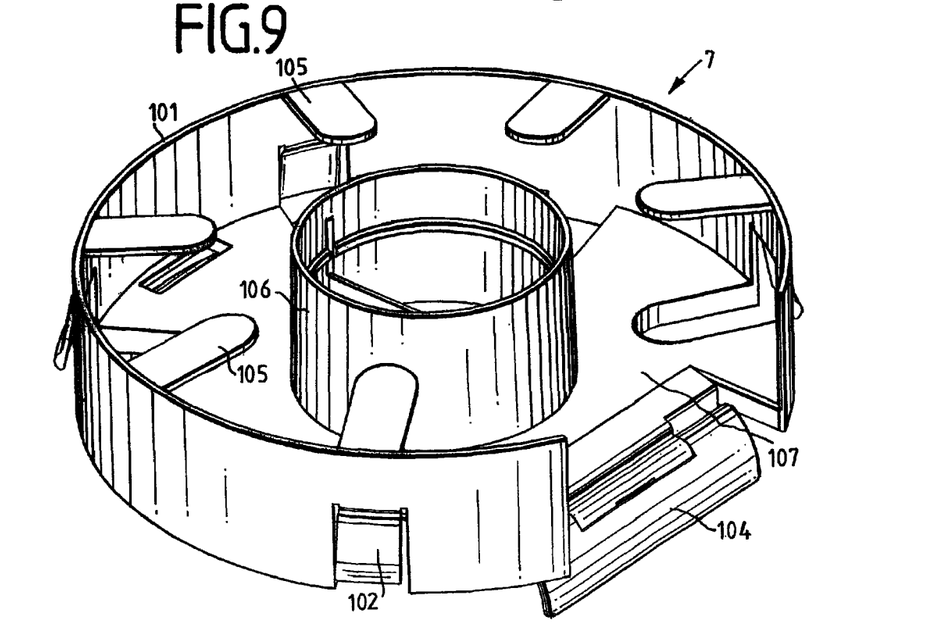
FIG. 9 shows a perspective illustration of the bundle core repository without the cover.

FIG. 9 illustrates the bundle core repository 7 without the cover 100. Retainers 105 are arranged on the inner sides of the outer face 101. Furthermore, a winding cylinder 106 is arranged centrally on a bottom face 107. The bundle cores 22 are guided by the bundle core guides 90 to the bundle core repository 7 and inserted through the opening 103, wound around the winding cylinder 106 and then guided out again through the opening 103. The bundle core repository 7 therefore makes it possible for reserve lengths of uncut bundle cores 22, which are only looped through the sleeve 1, to be deposited centrally in ordered fashion.

Figure 10:
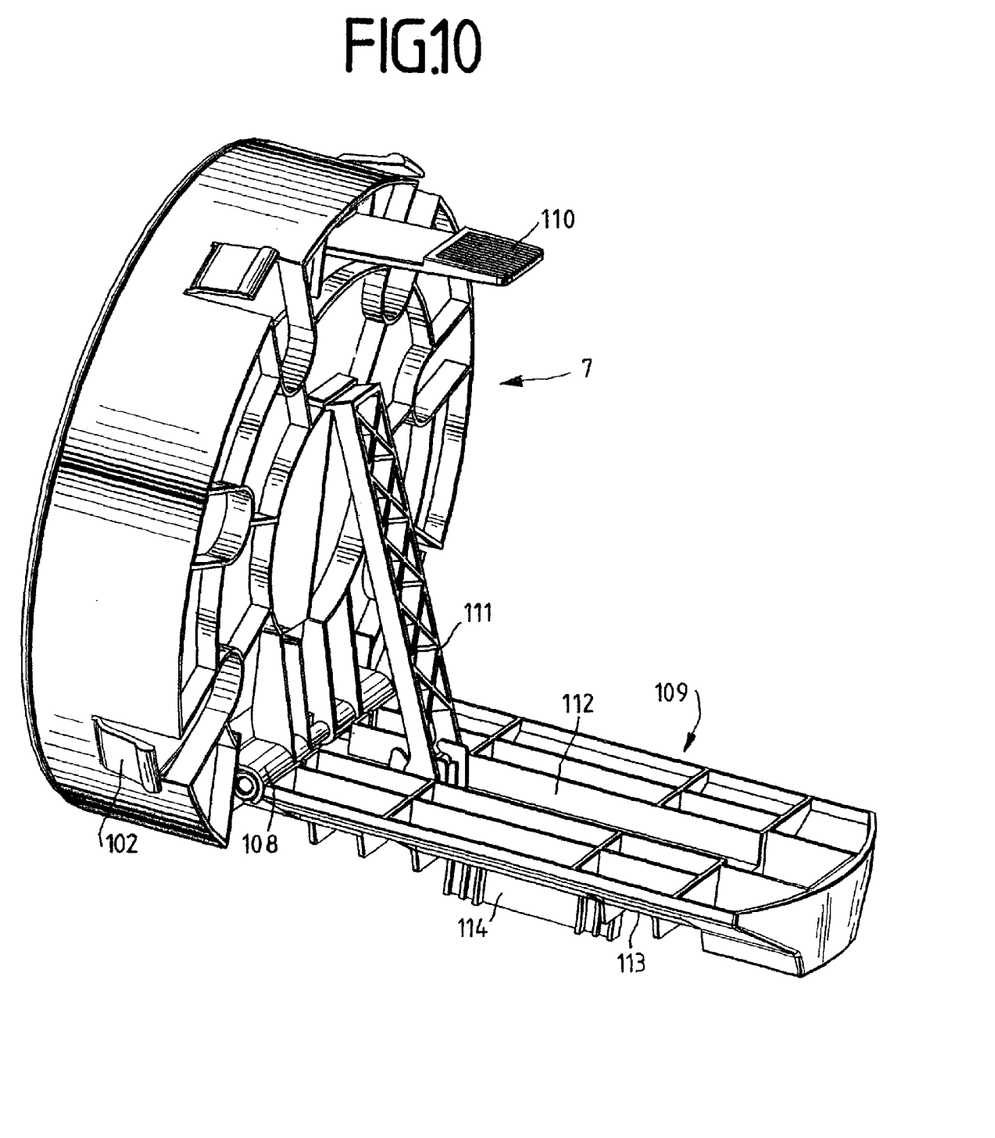
FIG. 10 shows a perspective view from below of the bundle core repository in the pivoted-up state.

FIG. 10 illustrates the bundle core repository 7 in a pivoted-up state. For this purpose, the bundle core repository 7 can be pivoted through approximately 90° with respect to a lower part 109 via a pivot bearing 108. The lower part 109 is latched to the carrier system 5. The bundle core repository is formed with a latching hook 110 on the lower side, which latching hook 110 latches with the lower part 109 in the initial position (see FIG. 1). In the pivoted-up position, the bundle core repository 7 is held by a latched-in consoleing strut 111 and is propped against the lower part 109. The consoleing strut 111 dips into a reciprocal 112 in the initial position. By means of a plug-type rail 114, which is arranged on a lower side 113 of the lower part 109, the lower part 109 with the bundle core repository 7 can then be plugged onto the upper side of the carrier system 5, the plug-type rail 114 latching in between the two U-shaped regions 83 of the profiled carriers 72.

FIG. 11 illustrates a side view of a housing upper part 120, which is consoled on the sleeve 1 from above and is connected to the housing lower part 3.

List of Reference Symbols
1 Sleeve
2 Optical waveguide cable
3 Housing lower part
4 Console
5 Carrier system
6 Fiber management unit
7 Bundle fiber repository
21 Central element
22 Bundle core
30 Opening
31 Base plate
32 Circumferential part
33 Screw
34 Thread
35 Sealing element
41 Lower side
42 Pedestal feet
43 Holes
44 Upper side
45 Rests
46 Ground plate
47 Holes
48 Angled sheet-metal part
49 Desired bending point
50 Fixing element
51 Jaw
52 Plate
53 Ground strip
54 Scroll spring
55 Clip
56 Fixing limb
61 Fiber guide front side/rear side
62 Covering
63 Coil former
64 Retainer
65 Lower side
66 Guide webs
67, 68 Guides
69 Opening
70 Stop edges
71 Central carrier
72 Profiled carrier
73 Upper side
74 Lateral fiber guide
80 Splicing cassette
81 Coverings
82 Plate-shaped region
83 U-shaped region
84 V-shaped region
85 Limb
86 Bent-back portions
87 Stopper
90 Bundle core guides
91 Central web
92 Edge
93, 94 Guides
95, 96 Parts
97 Shaft
98 Arrow-shaped attachment
99 Cut-free portion
100 Cover
101 Outer face
102 Props
103 Opening
104 Rounded-off portion
105 Retainer
106 Winding cylinder
107 Bottom face
108 Pivot bearing
109 Lower part
110 Latching hook
111 Consoleing strut
112 Reciprocal
113 Lower side
114 Plug-type rail
120 Housing upper part
V Front side
R Rear side

The invention claimed is:
1. A bundle core repository for a distribution device for optical waveguides, comprising:
a housing having a first side and an opposite second side, the first side of the housing defining a lateral opening leading to a winding chamber having a drum extending upwardly from a bottom face that separates the first side and the second side, the drum being configured to receive bundled optical waveguides wrapped therearound; and
a lower part coupled to the second side of the housing via a pivot bearing, the lower part being configured to couple to a carrier system.

2. The bundle core repository as claimed in claim 1, wherein a supporting strut, which, in a pivoted-up position, supports the bundle core repository against the lower part, is arranged on the lower part.

3. The bundle core repository as claimed in claim 1, wherein the bundle core repository can be pivoted through 90°.

4. The bundle core repository as claimed in claim 1, wherein the bundle core repository is sealed by a removable cover.

5. The bundle core repository as claimed in claim 1, wherein a latching hook, which latches with the lower part in an initial position, is arranged on the lower side of the bundle core repository.

6. The bundle core repository as claimed in claim 1, wherein the housing has a cylindrical shape.

7. The bundle core repository as claimed in claim 6, wherein sprung props are cut out of an outer face.

* * * * *